Sept. 3, 1935.   J. F. LEVENTHAL   2,013,350
MOTION PICTURE APPARATUS
Filed Nov. 5, 1934
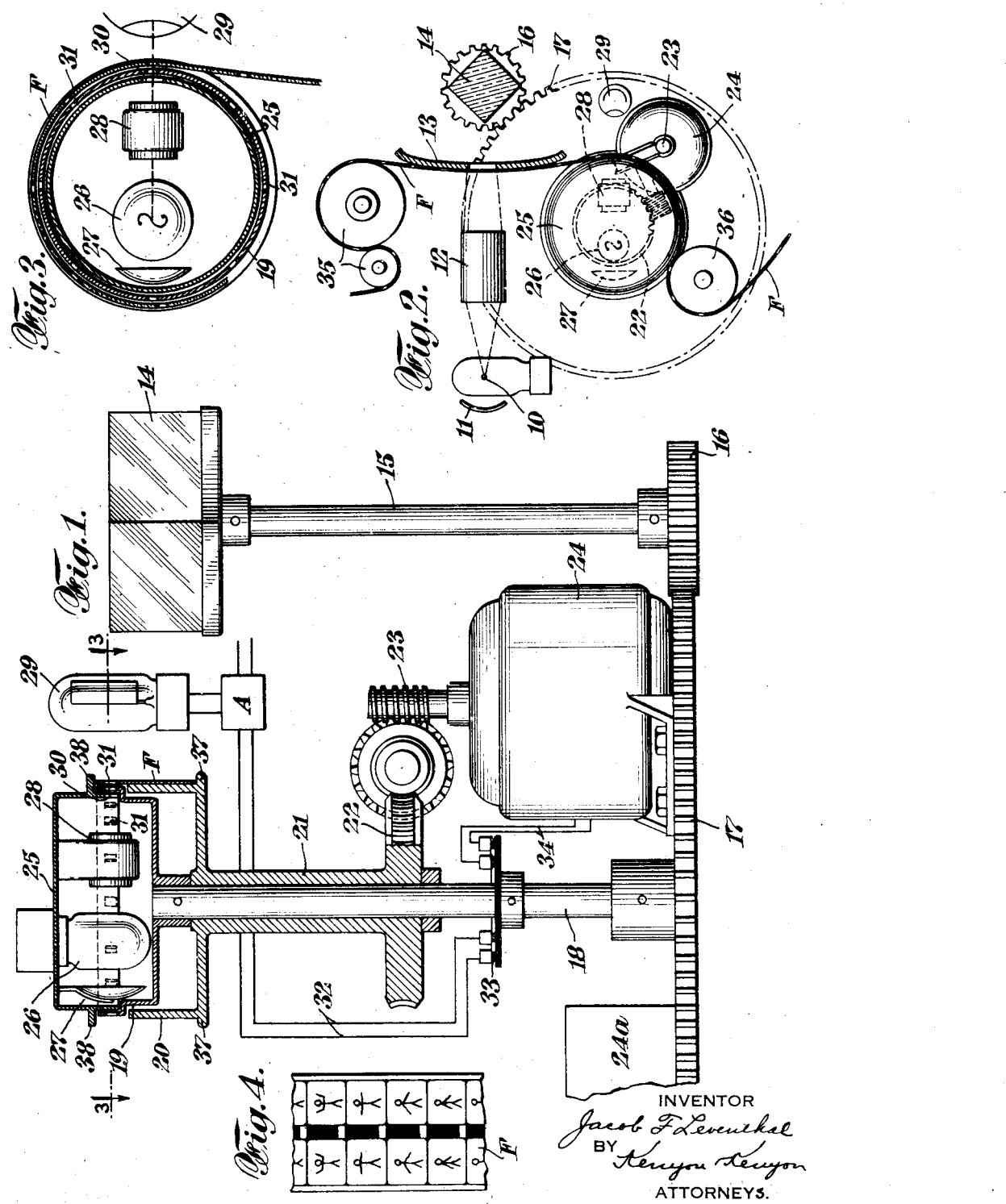
INVENTOR
Jacob F Leventhal
BY
Kenyon Kenyon
ATTORNEYS.

Patented Sept. 3, 1935

2,013,350

UNITED STATES PATENT OFFICE 2,013,350

MOTION PICTURE APPARATUS

Jacob F. Leventhal, New York, N. Y., assignor to Leventhal Patents, Inc., New York, N. Y., a corporation of Delaware Application November 5, 1934, Serial No. 751,444

16 Claims. (Cl. 80—16.8)

This invention relates to motion picture apparatus and more especially to film feeding devices therefor.

At present, motion picture film is customarily provided with perforations which cooperate with sprocket teeth of feeding mechanism operated to feed the film at a constant picture rate. In some types of film feeding mechanism, the perforations are engaged by the teeth of an intermittent pull-down sprocket or claw mechanism as well as by the teeth of a regulating sprocket, while in other types of feeding mechanism perforations are engaged only by the teeth of the regulating sprocket. Sprocket feeding has the undesirable feature for continuous film feed apparatus and sound-on-film apparatus that there is always a lack of perfect correspondence between the pitch of the sprocket teeth and the pitch of the film perforations. The film, therefore, is not fed at uniform velocity, but rather at slightly irregular velocity. This lack of correspondence is due to film shrinkage and increases with the extent of film shrinkage with consequent increase in the irregular velocity of the film. The ideal condition of uniform velocity of film feed cannot be realized by sprocket feeding.

In the co-pending application of Leventhal, et al. Serial No. 745,683, there is disclosed apparatus for feeding film at uniform velocity and the present invention comprises an improved apparatus of the type disclosed therein.

In the apparatus disclosed in said application, film provided along one edge with alternating light transmitting and light obstructing areas is fed between a light sensitive element and a light source and movable means are provided to cooperate with the light transmitting and light obstructing areas to control the amount of light transmitted from the light source to the light sensitive element. The movable means is operated at a predetermined speed governed by the picture cycle frequency of the apparatus and the film is fed by means controlled as to speed by the light sensitive element. In this apparatus, the velocity of the film feed is maintained substantially constant and the film is fed at a predetermined picture rate.

The movable means above referred to comprises a control cylinder and the film feeding means comprises a drum rotatable about separate axes and with both of which the film contacts. The arrangement is such that there is slight slippage of the film on the control cylinder.

An object of this invention is an improved film-feeding device of the general type disclosed in the above-entitled application in which the control cylinder and feed drum have a common axis, this making the apparatus more compact and reducing the effect of any eccentricity and in which slippage of the film is avoided.

Other objects, novel features and advantages of this invention will become apparent from the following specification and accompanying drawing, wherein:

Fig. 1 is a vertical section through an apparatus embodying the invention;

Fig. 2 is a plan view partly in section,

Fig. 3 is a section on the line 3—3 of Fig. 1, and

Fig. 4 is a plan view of film.

The invention is herein specifically disclosed as embodied in a continuous-type projector, but may be embodied in any type of motion picture apparatus having means for governing picture cycle frequency. Referring now to Fig. 2, 10 is a light source, 11 a reflector therefor and 12 a condenser lens which directs a beam of light through the film gate 13 to a rotatable optical compensator 14, which may be any of the known devices operative when rotated in timed relation to a continuously moving film to produce stationary screen images of pictures on film. The compensator is specifically shown as a refractor having two pairs of plane-parallel faces and operative to compensate four pictures for each revolution thereof. The compensator is carried by the shaft 15 to which is fixed a gear 16 meshing with gear 17 carried by the shaft 18. A cylinder 19 is fixed to the end of the shaft 18 and is of slightly larger diameter near its rim than the remainder. The feed drum 20 surrounds the smaller diameter portion of the cylinder 19 and is of slightly larger exterior diameter than the larger part of the cylinder 19. From the feed drum there extends a collar 21 journaled on the shaft 18 and provided with a worm wheel 22 which, by suitable reduction gearing, is driven from the armature shaft 23 of a motor 24 bolted to the gear 17. A suitable counterweight 24a for the motor 24 is also carried by the gear 17.

A cover 25 has a cylindrical flange depending into the larger diameter portion of the cylinder 19 and this cover is supported in this position against rotation by means, not shown. The cover supports a lamp 26, reflector 27 therefor, and condenser lens 28 which directs a beam of light toward a light sensitive element or photo-electric cell 29 arranged exterior of the cylinder, the cover 26 being provided with a transparency 30 through which light may pass to the element 29 and the cylinder 19 being provided with a peripheral series of transparencies 31 adapted successively to pass over the transparency 30 upon rotation of the cylinder. Preferably, these transparencies 30 and 31 are merely apertures in the cover 25 and cylinder 19 respectively The photo-electric cell 29 is connected to a power amplifier A, the output of which is connected to the motor 24 through conductors 32, slip rings 33 carried by the shaft 18 and conductors 34. The photo-electric cell is thus effective to vary the speed of the motor 24 in a manner later to be described.

The film F is provided along one edge with alternate light transmitting areas and light obstructing areas and the light transmitting areas may comprise apertures in the film. The film passes from guide rollers 35, past the film gate 13 and part way around the feed drum 20 and between the feed drum and a friction roller 36.

The feed drum is provided with a flange 37 between which and a stationary guide 38, the film passes so as to bring the film transparencies into alinement with the transparencies 30 and 31. By reason of the fact that the diameter of the drum 20 exceeds that of the larger portion of the cylinder 19 the film avoids contact with the cylinder. The relation between the gears 16 and 17 and the number and spacing of the transparencies 31 is such that one aperture passes between the light source and the photo-electric cell for each compensation cycle of the compensator, the apertures 30 and 31 being of the same area as the film transparencies. The drum 20 is operated at the proper speed under the control of the photo-electric cell to feed the film at the rate of one picture per compensation cycle. The drum 20 draws the film through the film gate and around the cylinder 19 at a linear speed slightly greater than the surface speed of the cylinder and as each aperture 31 approaches the edge of the aperture 30, a transparency on the film registers to some extent with the aperture thus regulating the amount of light transmitted to the photo-electric cell. If the film speed is too slow, the registration will be small and the amount of light passing to the photo-electric cell will be correspondingly small. The photo-electric cell thereupon decreases the speed of the motor 24 to decrease the speed of the drum 20 sufficiently to correct the condition. If the film speed is too high, the registration will be great and the amount of light passing to the photo-electric cell will be correspondingly great. The photo-electric cell thereupon increases the speed of the motor 24 to increase the speed of the drum 20 sufficient to correct the condition. The relationship between the cylinder apertures 31 and the film transparencies has the same effect as sprocket teeth and perforations with respect to obtaining framing of the picture. The film will always be advanced one picture frame for each compensation cycle and accurate framing will result. At starting, even though no registration exists, the desired condition will automatically be arrived at after a short running time.

Primary rotation of the drum 20 is effected by reason of the fact that the motor and the driving connections between it and the collar 21 constitutes a key between the shaft 18 and the collar 21. Secondary rotation of either additive or subtractive nature is effected by operation of the motor 24. The exterior diameter of the drum 20 is such that with the motor 24 inoperative, the linear speed of the film would be less than one picture per compensation cycle. The motor 24 is, therefore, always operating and turning the drum 20 relative to the shaft 18 and variation in the amount of light reaching the light sensitive element 29 causes variation in the speed of the motor 24 to advance or retard the linear speed of the film to obtain the desired speed.

Although the invention has been disclosed as embodied in a projector, it is evident that it may be equally well embodied in any motion picture apparatus of the picture cycle type such as cameras, printers, etc. and it is intended that the claims shall cover all apparatus of this type as well as projectors. Also, it is to be understood that increase of light received by the photo-electric cell may be used either to increase the speed of the motor 24 or to decrease the speed of this motor. The desired result of proper film speed will be obtained. Furthermore, the positions of the lamp 26 and photo-electric cell 29 may be interchanged.

The apparatus disclosed may also be used to feed film F of the type shown in Fig. 4, such film being of double normal width and being provided with two rows of pictures with a row of alternating light transmitting and light obstructing areas extending between the picture rows. When used with such film, the guide 38, of course, will be correspondingly re-positioned to accommodate it to the greater film width.

For simplicity, the supporting frame for the various elements has not been shown, but it is obvious that suitable supporting means are provided for maintaining the parts in the relation shown in the drawing. It is, of course, understood that various changes may be made in the structure above described, without in any way departing from the spirit of the invention as defined in the appended claims.

I claim:

1. In motion picture apparatus having mechanism governing the picture cycle frequency thereof, means for feeding film provided with a longitudinal row of alternating light transmitting and light obstructing areas, said means comprising a shaft, means for rotating said shaft in timed relation with said picture cycle frequency governing mechanism, a cylinder fixed to said shaft and having a peripheral series of light transmitting areas, a light source within said cylinder, a light sensitive element exterior of said cylinder, a film feed drum coaxial with said cylinder and arranged to locate the film transparencies in alinement with the cylinder transparencies, and feed drum driving means responsive to said light sensitive element.

2. In motion picture apparatus according to claim 1, feed drum driving means comprising a variable speed motor fixed to said shaft, driving connections between said motor and feed drum, and connections between said light sensitive element and motor for controlling the operation of the latter by the former.

3. In motion picture apparatus having mechanism governing the picture cycle frequency thereof, means for feeding film provided with a longitudinal row of alternating light transmitting and light obstructing areas, said means comprising a shaft, means for rotating said shaft in timed relation with said picture cycle frequency governing mechanism, a film feed drum journaled on said shaft, a cylinder fixed to said shaft and having a portion of slightly less exterior diameter than said feed drum, and a peripheral series of light transmitting areas in said portion, said feed drum and cylinder being so related as to locate the film transparencies in alinement with the cylinder transparencies, a light producing element and a light sensitive element, one of said elements being arranged within and the other of said elements being arranged exterior of said cylinder, and feed drum driving means responsive to said light sensitive element.

4. In motion picture apparatus according to claim 3, feed drum driving means comprising a variable speed motor fixed to said shaft for rotation thereof, driving connections between said motor and feed drum, and connections between said light sensitive element and motor for controlling the operation of the latter by the former.

5. In motion picture apparatus having mechanism governing the picture cycle frequency thereof, means for feeding film provided with a longitudinal row of alternating light transmitting and light obstructing areas, said means comprising a shaft, means for rotating said shaft in timed relation with said picture cycle frequency governing mechanism, a film feed drum journaled on said shaft, a cylinder fixed to said shaft and having a portion of slightly less exterior diameter than said feed drum, and a peripheral series of light transmitting areas in said portion, said feed drum and cylinder being so related as to locate the film transparencies in alinement with the cylinder transparencies, a stationary cover for said cylinder having a flange extending thereinto and provided with a light transparency with which the cylinder transparencies are registrable, a light producing element and a light sensitive element, one of said elements being supported by said cover within said cylinder and the other of said elements being exterior of said cylinder, and feed drum driving means responsive to said light sensitive element.

6. In motion picture apparatus according to claim 5 feed drum driving means comprising a variable speed motor fixed to said shaft for rotation thereof, driving connections between said motor and feed drum, and connections between said light sensitive element and motor for controlling the operation of the latter by the former.

7. In motion picture apparatus having mechanism governing the picture cycle frequency thereof, means for feeding film provided with a longitudinal row of alternating light transmitting and light obstructing areas, said means comprising a shaft, means for rotating said shaft in timed relation with said picture cycle frequency governing mechanism, a cylinder fixed to said shaft and having a peripheral series of light transmitting areas, a film feed drum coaxial with said cylinder and arranged to locate the film transparencies in alinement with the cylinder transparencies, a light source and a light sensitive element between which the film and cylinder transparencies pass, and feed drum driving means responsive to said light sensitive element.

8. In motion picture apparatus according to claim 7, feed drum driving means comprising a variable speed motor fixed to said shaft, driving connections between said motor and feed drum, and connections between said light sensitive element and motor for controlling the operation of the latter by the former.

9. Motion picture apparatus comprising a rotatable compensator, means for rotating the same, means for feeding film provided with a longitudinal row of alternate light transmitting and light obstructing areas, said means comprising a shaft, means for rotating said shaft in timed relation with said compensator, a cylinder fixed to said shaft and having a peripheral series of light transmitting areas, a light source within said cylinder, a light sensitive element exterior of said cylinder, a film feed drum coaxial with said cylinder and arranged to locate the film transparencies in alinement with the cylinder transparencies, and feed drum driving means responsive to said light sensitive element.

10. Motion picture apparatus according to claim 9 wherein the feed drum driving means comprises a variable speed motor fixed to said shaft, driving connections between said motor and feed drum, and connections between said light sensitive element and motor for controlling the operation of the latter.

11. Motion picture apparatus comprising a rotatable compensator, means for rotating the same, means for feeding film provided with a longitudinal row of alternate light transmitting and light obstructing areas, said means comprising a shaft, means for rotating said shaft in timed relation with said compensator, a film feed drum journaled on said shaft, a cylinder fixed to said shaft and having a portion of slightly less exterior diameter than said feed drum, and a peripheral series of light transmitting areas in said portion, said feed drum and cylinder being so related as to locate the film transparencies in alinement with the cylinder transparencies, a light producing element and a light sensitive element, one of said elements being within and the other of said elements being exterior of said cylinder, and feed drum driving means responsive to said light sensitive element.

12. Motion picture apparatus according to claim 11, wherein the feed drum driving means comprises a variable speed motor fixed to said shaft for rotation therewith, driving connections between said motor and said drum, and connections between said light sensitive element and motor for controlling the operation of the latter by the former.

13. Motion picture apparatus comprising a rotatable compensator, means for rotating the same, means for feeding film provided with a longitudinal row of alternate light transmitting and light obstructing areas, said means comprising a shaft, means for rotating said shaft in timed relation with said compensator, a film feed drum journaled on said shaft, a cylinder fixed to said shaft and having a portion of slightly less exterior diameter than said feed drum, and a peripheral series of light transmitting areas in said portion, said feed drum and cylinder being so related as to locate the film transparencies in alinement with the cylinder transparencies, a stationary cover for said cylinder having a flange extending thereinto and provided with a light transparency with which the cylinder transparencies are registrable, a light producing element and a light sensitive element, one of said elements being supported by said cover within said cylinder and the other of said elements being exterior of said cylinder, and feed drum driving means responsive to said light sensitive element.

14. Motion picture apparatus according to claim 13, wherein the feed drum driving means comprises a variable speed motor fixed to said shaft for rotation thereof, driving connections between said motor and feed drum, and connections between said light sensitive element and motor for controlling the operation of the latter by the former.

15. Motion picture apparatus comprising a rotatable compensator, means for rotating the same, means for feeding film provided with a longitudinal row of alternating light transmitting and light obstructing areas, said means comprising a shaft, means for rotating said shaft in timed relation with said compensator, a cylinder fixed to said shaft and having a peripheral series of light transmitting areas, a film feed drum coaxial with said cylinder and arranged to locate the film transparencies in alinement with the cylinder transparencies, a light source and a light sensitive element between which the film and cylinder transparencies pass, and feed drum driving means responsive to said light sensitive element.

16. Motion picture apparatus according to claim 15 wherein the feed drum driving means comprises a variable speed motor fixed to said shaft, driving connections between said motor and feed drum, and connections between said light sensitive element and motor for controlling the operation of the latter by the former.

JACOB F. LEVENTHAL.